Dec. 6, 1955 N. O. CAMPISE ET AL 2,725,744
CONTINUOUS VISCOSIMETER
Filed July 8, 1953
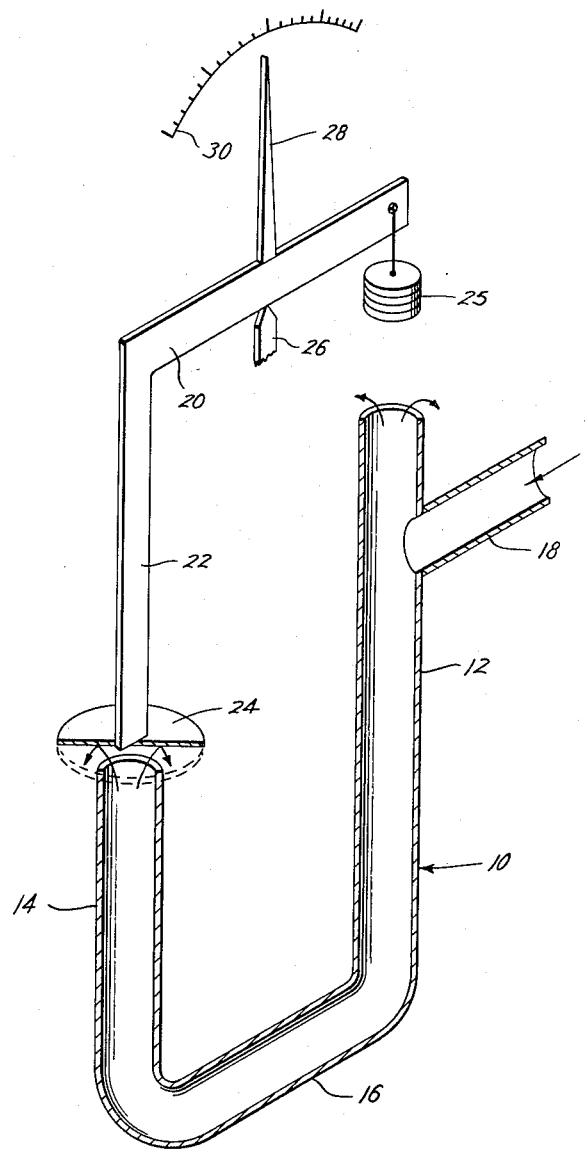
Nash O. Campise
Maurice C. Brock
INVENTORS
BY James F. Weiler
ATTORNEYS United States Patent Office 2,725,744
Patented Dec. 6, 1955

2,725,744
CONTINUOUS VISCOSIMETER

Nash O. Campise and Maurice C. Brock, Houston, Tex., assignors to Houston Oil Field Material Company, Inc., Houston, Tex., a corporation of Delaware Application July 8, 1953, Serial No. 366,715

5 Claims. (Cl. 73—56)

The present invention relates to apparatus for making measurements, and more particularly, for determining continuously the viscosity of fluids flowing through the apparatus.

The present invention is suitable for a wide variety of uses and may be used to measure the viscosity of various fluids. It is particularly suited, however, for use in determining the viscosity of drilling fluid or mud used in the rotary drilling of oil wells and the like, and the description, for the purpose of the disclosure, is directed toward this use. Other uses, of course, will be readily apparent.

In the drilling of oil wells and the like by the rotary method it is necessary to circulate drill fluid or mud. It is of the greatest importance to the rotary driller that the circulating fluid perform certain functions, and failure of the circulating fluid to perform properly all the functions expected of it is a major concern of the drilling industry.

In general, the principal functions of drilling mud are overcoming gas, oil and water flow into the well bore, preventing the walls of the well bore from caving, maintaining the hole or well bore free of cuttings, cooling the bit and lubricating the drill stem, and the drill fluid characteristics should be such that good cuttings, cores and electric logs can be obtained and any possible producing formations are not damaged during the drilling operation. The amount of solids that can be added and still keep a drilling fluid or mud pumpable is limited. Inasmuch as the mud or drilling fluid is circulated, maintaining the desired viscosity is of prime importance in a drilling fluid or mud performing its functions, and it is customary periodically to test the viscosity of the drill fluid or mud during drilling operations.

Viscosity tests of drilling fluid or mud are made by use of the Marsh funnel and the Stormer viscosimeter, although numerous other viscosimeters have been designed for use with various fluids and drilling fluid. These and other viscosity tests are batch tests and are ordinarily made periodically, such as once each hour, in order that the viscosity of the drilling fluid may be maintained at a predetermined value at all times. Much effort and money have been expended in the development of satisfactory instruments for measuring the viscosity of drilling muds and this is due largely to the fact that drilling fluids or mud fundamentally are thixotropic and, heretofore, viscosity characteristics of such materials could not be described or indicated by means of a single instrument. In addition, it is of prime importance that the viscosity of the drilling fluid or mud be at a predetermined value for the mud to function as expected and it is therefore desirable to provide a continuous and instantaneous indication of the viscosity of the mud at all times in order that remedial measures may be taken to adjust the viscosity to the desired value as the viscosity varies therefrom. During the process of drilling a well many subsurface formations and drilling conditions may be encountered which affect the drilling fluid adversely and require special mud properties for satisfactory handling. Most drilling muds or drilling fluids are highly reactive and are easily subject to contamination with resultant development of objectionable properties. Accordingly, it is of great importance to have available at all times instantaneous and continuous information of the viscosity of the drill fluid or mud in a circulating system.

It is, therefore, a general object of the present invention to provide a viscosimeter which continuously and instantaneously measures the viscosity of the fluid flowing therethrough.

It is a further object of the present invention to provide a viscosimeter for making viscosity tests continuously as distingushed from batch tests, and in which accurate and reliable results are obtained.

It is a further object of the present invention to provide a viscosimeter for making continuous viscosity tests of fluid, which viscosimeter may be connected to a circulation system in order that the viscosity of the fluid circulating therein is known at all times.

It is yet a further object of the present invention to provide a viscosimeter for making continuous tests of viscosity of fluids which is simple, inexpensive to manufacture and maintain, which is rugged and durable in use, and which gives accurate and reliable results.

It is yet a further object of the present invention to provide a continuous viscosimeter in which the conditions of flow can be formulated mathematically, which is capable of continuous operation for an indefinite period of time at constant or varying shear rates over a range covering the pumping rates of drilling fluid, such as the drilling fluid circulating in a circulatory system, which is capable of handling the normally suspended matter in drilling muds without seizing, and which gives accurate, duplicable, instantaneous readings expressible in desired viscosity units, such as American Petroleum Institute March funnel seconds.

It is yet a further object of the present invention to provide a continuous viscosimeter in which the effects of thixotropy of the fluid being tested are nullified.

Other and further objects and features of the present invention will be apparent from the following description of an example of the invention, given for the purpose of disclosure, and by reference to the accompanying drawing, where The figure is a diagrammatic perspective view, partly in section, of a viscosimeter constructed in accordance with the invention for continuously testing the viscosity of fluids.

Referring now to the drawing, the reference numeral 10 designates a substantially U-shaped body formed of tubing having the upstanding open ended vertical legs 12 and 14 joined by the lateral leg 16. An inlet pipe 18 is provided adjacent the upper end of the leg 12 of the U-shaped tube 10. The leg 12 of the U-shaped tube 10 preferably is considerably longer than the leg 14, and the inlet 18 preferably is positioned in the leg 12 above the upper end of the leg 14 in order to assure a steady flow of fluid through the tube 10 by gravity. If desired, the tube 10 may have closed ends and the fluid may be pumped through the apparatus in order to measure the viscosity over the range of pumping rates used in circulating the drilling fluid in the well bore. In this event, however, it is preferable to provide an overflow arrangement in order that a steady stream of fluid flowing through the tube 10 is assured.

The arrangement illustrated is satisfactory, however, and fluid flows into the U-shaped tube 10 from the inlet 18 and flows out the top of the tube 14. Since the upper end of the tube 12 is open, a steady stream of fluid flows by gravity through the device. The fluid flowing out the top of the tubes 12 and 14 may be collected in any suitable container thereunder, not shown, and the inlet pipe 18 and the container (not shown) may be connected to any fluid system, such as the circulating system of drilling fluid used in drilling oil wells and the like by the rotary method. It seems apparent that suspended matter in the drilling mud will flow through the U-shaped tube 10 without seizing, and in the event the apparatus is connected in the circulatory system at a point where the fluid is flowing from a well bore, the viscosity of the drill fluid will be measured at substantially the temperature of the fluid as it is circulating in the well bore.

The balanced beam 20 has the depending arm 22 to which is secured at its lower end the member 24, which serves as a bob and which may take the form of a circular and flat disc, as illustrated. Preferably, the bob should provide sufficient surface to be pushed upwardly by the column of fluid being discharged by leg 14, as will be apparent later. The beam may be counterbalanced at the other end by the weights 25 suspended therefrom, and, thus, fluid flowing through the U-shaped tube 10 exerts a viscosity push upwardly on the lower surface of the bob 24. The beam 20 is balanced on the knife edge 26 and the beam 20 has the upstanding pointer 28 which indicates the position of the beam 20 on the calibrated scale 30. The scale 30 may be calibrated to give a direct and instantaneous reading in any desired units of the viscosity of the fluid flowing through the U-shaped tube. The amount of push against the bob 24 will vary with the height of the column of fluid as it is discharged from the open end of the leg 14. The thinner the column of fluid, the higher the column of fluid discharging and the greater the push exerted against the bob 24. It seems apparent that the effect of density is nullified as the height of the column will depend on viscosity, and since there is a flow of fluid, thixotropy of the fluid does not affect the readings, nor do suspended solids cause seizing.

In operation, the inlet 18 is connected to a circulatory system, and preferably to the drilling fluid outlet pipe from the well bore. Fluid flows from the inlet 18 down the leg 12, a portion overflowing at the upper end thereof through the lateral leg 16 and up the upstanding leg 14, out the top thereof and being collected by a suitable collector, not shown, for flowing the fluid back into the circulatory system. Thus, fluid to be tested as to its viscosity is continuously flowed through the device. Inasmuch as the fluid is continuously flowing, the effect of thixotropy is nullified and, in the event the inlet pipe 18 is connected to the fluid outlet pipe of the circulatory system, the temperature of the drilling fluid being tested will be substantially the same as the temperature of the drilling fluid circulating in the well bore during the drilling operation.

As indicated heretofore, a viscosity push upwardly is effected upon the disc 24, thereby controlling the position of the balanced beam 20, the position being indicated on the scale 30 by means of the pointer 28, the scale being calibrated to give a direct and instantaneous reading in the desired viscosity units. As indicated, the density and thixotropy of the fluid do not affect the readings nor do solids suspended in the fluid cause seizing. Also, the amount of push against the disc 24 will vary with the height of the column of fluid as it is discharged from the open end of the leg 14. The thinner the column of fluid, the higher the column of fluid and greater push exerted against the underside of the disc 24.

It will be understood, of course, that many and numerous changes may be made in the details and arrangement of parts. For example, if desired, any suitable linkage to a suitable indicating means may be utilized to indicate the position of the beam and thereby the viscosity of the fluid flowing through the apparatus. If desired, a sliding weight or balance of some type and a co-acting scale might be placed on the beam 20, or means may be provided to make a permanent record of the viscosity. These arrangements are conventional and no detailed discussion thereof is deemed necessary. The overflow elements may be enclosed and direct connections made to a circulating system, and the body 10 may be of any preferred shape.

Generally, the invention comprises a viscosimeter which may be connected at any desired point in a circulatory system, and which continuously and instantaneously measures the viscosity of fluids flowing therethrough, the effects of density, thixotropy and the like being nullified, and the viscosity of the fluid being tested controlling the position of the balanced beam whereby a direct, instantaneous, and continuous reading on a suitable scale or indicating means in desired units is provided and a permanent record made.

Accordingly, the viscosimeter of the present invention is well suited to attain the objects mentioned and others inherent therein, and the invention is to be limited only by the spirit thereof and the scope of the appended claims.

What is claimed is:

1. An apparatus for continuously testing viscosity of fluids comprising, a substantially U-shaped hollow body having substantially upstanding vertical legs joined by a lateral leg, fluid inlet means in one of said legs, a balanced beam, a bob rigidly secured to one end of the beam and extending over the outlet of one of such legs, the bob adapted to be pushed upwardly by the column of fluid discharging from the leg, and means for indicating the viscosity of fluid flowing through the body in response to the position of such balanced beam.

2. An apparatus for continuously testing viscosity of fluids comprising, a substantially U-shaped tube having substantially upstanding vertical legs joined by a lateral leg, one of the upstanding vertical legs being longer than the other vertical leg, fluid inlet means in the longer leg above the upper end of the shorter vertical leg, a balanced beam, a bob rigidly secured to one end of the said beam adapted to be pushed upwardly by the column of fluid discharging from the shorter leg, and means for indicating the viscosity of fluid flowing through the body in response to the position of such balanced beam.

3. The apparatus of claim 2 including a counterbalance suspended from the other end of the balanced beam.

4. An apparatus for continuously testing fluid comprising, a substantially U-shaped tube having substantially upstanding vertical legs joined by a lateral leg, one of the vertical legs being longer than the other vertical leg, fluid inlet means in the longer upstanding vertical leg above the upper end of the shorter upstanding vertical leg, a beam balanced by a knife edge, a bob having a relatively large nether surface rigidly secured to one side of such beam and extending downwardly over the outlet of the shorter upstanding vertical leg, the bob adapted to be pushed upwardly by the column of fluid discharging from the shorter leg, and indicating means responsive to the position of such beam.

5. Apparatus for connection to a circulation system for continuously testing viscosity of fluids flowing therein comprising, a substantially U-shaped tube having substantially upstanding vertical legs joined by a lateral leg, the upper ends of such vertical legs being open and one of such vertical legs being longer than the other vertical leg, fluid inlet means in the longer vertical leg above the upper end of the shorter vertical leg for establishing communication with such circulation system, a beam balanced by a knife edge, a bob having a relatively large nether surface rigidly secured to one side of said beam and extending downwardly over the outlet of the shorter upstanding vertical leg, the bob adapted to be pushed upwardly by the column of fluid discharging from the shorter leg, and viscosity indicating means linked to and responsive to the position of said beam for indicating the viscosity of fluids flowing through the substantially U-shaped tube.

References Cited in the file of this patent

UNITED STATES PATENTS

| | | |
|---|---|---|
| 2,314,991 | Knauth | Mar. 30, 1943 |
| 2,343,030 | Simmons | Feb. 29, 1944 |